(12) United States Patent
Wang

(10) Patent No.: US 8,561,919 B2
(45) Date of Patent: Oct. 22, 2013

(54) FOAM SPRAY HEAD ASSEMBLY

(75) Inventor: Ya-Tsan Wang, Shanghai (CN)

(73) Assignee: Derxin (Shanghai) Cosmetics Co., Ltd., Shanghai (CN)

( * ) Notice: Subject to any disclaimer, the term of this patent is extended or adjusted under 35 U.S.C. 154(b) by 606 days.

(21) Appl. No.: 12/923,680

(22) Filed: Oct. 4, 2010

(65) Prior Publication Data

US 2012/0080539 A1 Apr. 5, 2012

(51) Int. Cl.
*B05B 7/00* (2006.01)

(52) U.S. Cl.
USPC ... 239/343; 239/337; 222/189.09; 222/145.5; 222/380; 222/321.9; 222/190

(58) Field of Classification Search
USPC ............ 222/190, 189.06, 189.09, 145.5, 380, 222/321.9, 321.7; 239/8, 10, 337, 340, 343, 239/350, 353, 370, 428.5
See application file for complete search history.

(56) References Cited

U.S. PATENT DOCUMENTS

| | | | |
|---|---|---|---|
| 7,059,499 B2* | 6/2006 | Masuda | 222/321.9 |
| 8,376,190 B2* | 2/2013 | Choi et al. | 222/190 |
| 8,439,233 B2* | 5/2013 | Wang | 222/321.2 |
| 2007/0119864 A1* | 5/2007 | Tsai | 222/137 |
| 2008/0083783 A1* | 4/2008 | Nelson | 222/153.13 |
| 2008/0251540 A1* | 10/2008 | Choi et al. | 222/190 |
| 2010/0111735 A1* | 5/2010 | Tu | 417/545 |
| 2010/0320232 A1* | 12/2010 | van der Heijden et al. | 222/135 |
| 2011/0297700 A1* | 12/2011 | Santagiuliana | 222/153.13 |

* cited by examiner

*Primary Examiner* — Jason Boeckmann

(57) ABSTRACT

A foam spray head assembly includes a head, a first piston unit, a valve unit, a link, a second piston unit, a cylinder, a resilient member and a resilient valve. The valve unit is directly connected to the head to allow the valve unit to receive the pressing force of the head to quickly respond in the form of reciprocating motion. The parts made of metal such as the spring is isolated from the liquid to ensure that the liquid is not affected by the metal.

13 Claims, 5 Drawing Sheets

FOAM SPRAY HEAD ASSEMBLY

BACKGROUND OF THE INVENTION (1) Field of the Invention

The present invention relates to a spray head assembly, and more particularly, to a foam spray head assembly.

(2) Description of the Prior Art

A conventional spray head assembly 100 is shown in FIG. 5 and generally includes a head 101 with a nozzle 101a and a mounting part 102 is connected to the head 101. The mounting part 102 is connected to a suction tube 103 which has a cone-shaped member 104 connected thereto. A mount tube 105 is connected to the cone-shaped member 104 and has two holes 105a which are covered by the cone-shaped member 104. A spring 106 is connected to the mount tube 105 and a bead 107 is biased by the spring 106. A reception tube 108 accommodates the suction tube 103, the cone-shaped member 104, the mount tube 105, the spring 106 and the bead 107 therein, and a hose 109 is connected to the reception tube 108.

When using the assembly, the head 101 is pushed to force the air in the bottle to escape from the nozzle 101 so that a low pressure is formed in the head 101 to suck the liquid in the bottle via the hose 109 into the reception tube 108. The mount tube 105 is applied byte force of the spring 106 to push the bead 107 to seal the opening of the reception tube 108 and gap is defined between the mount tube 105 and the cone-shaped member 104. Therefore, the liquid in the reception tube 108 flows into the mount tube 105 via the holes 105a. The liquid is then sucked by the suction tube 103 and ejected from the nozzle 101a of the head 101. When releasing the head 101, the liquid in the reception tube 108 flows back into the bottle.

However, the conventional spray head assembly is designed to suck liquid and cannot suck the liquid together with air which makes the liquid into foam. Generally, the users spray the liquid such as shampoo from the bottle and then scrub the hands to make the shampoo into foam. The amount that the shampoo is sprayed cannot be easily controlled so that the foam is either too much or not enough. This is inconvenient for the users. Besides, the spring 106 and the bead 107 are made by metal which are in contact with the liquid in the reception tube 108 and the liquid may have chemical action with the metal and may be harmful to the users.

The present invention intends to provide a spray head assembly that improves all of the shortcomings of the conventional spray head assembly.

SUMMARY OF THE INVENTION

The present invention relates to a spray head assembly and comprises a head having a nozzle and a space defined therein. A filter tube is located in the space. A first piston unit has a top opening and a bottom opening, and a sealing member is located in the bottom opening. A valve unit has a first valve and a second valve, wherein the first valve has a first end connected to the first piston unit and a second end of the first valve is connected to the filter tube and the head. The second valve has a first end connected to the first valve and is mounted to the first piston unit. The second valve has a flange which is separated from the sealing member to form an inlet path when the first valve moves toward the second valve.

A link has a tubular portion which extends through the second valve. Multiple grooves are defined axially in an outer surface of the tubular portion. A stop flange extends radially from an end of the tubular portion. A second piston unit is slidably mounted to the link and movable along the link to seal the grooves or to allow the grooves to be exposed. A cylinder has a top chamber and a bottom chamber, wherein the bottom chamber accommodates the second piston unit and the link. A through hole is defined through the bottom chamber. A resilient member is located in the top chamber and contacts between the second valve and an inner end of the top chamber. A resilient valve is a spiral valve and located in the bottom chamber of the cylinder. The resilient valve is movable to seal or open the through hole. A positioning member is mounted to the bottle to connect the foam spray head assembly to the bottle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
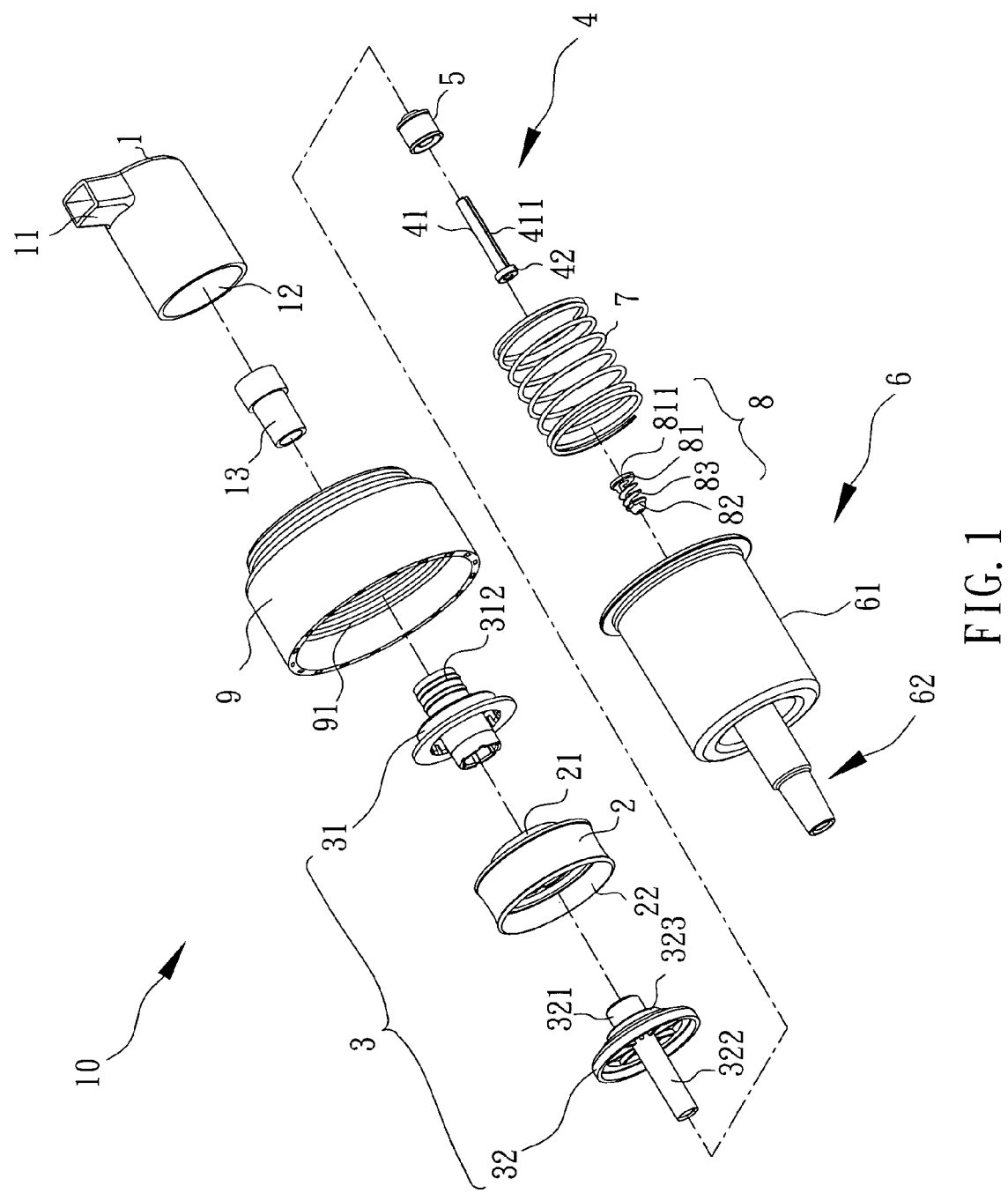
FIG. 1 is an exploded view to show the foam spray head assembly of the present invention.
Figure 2:
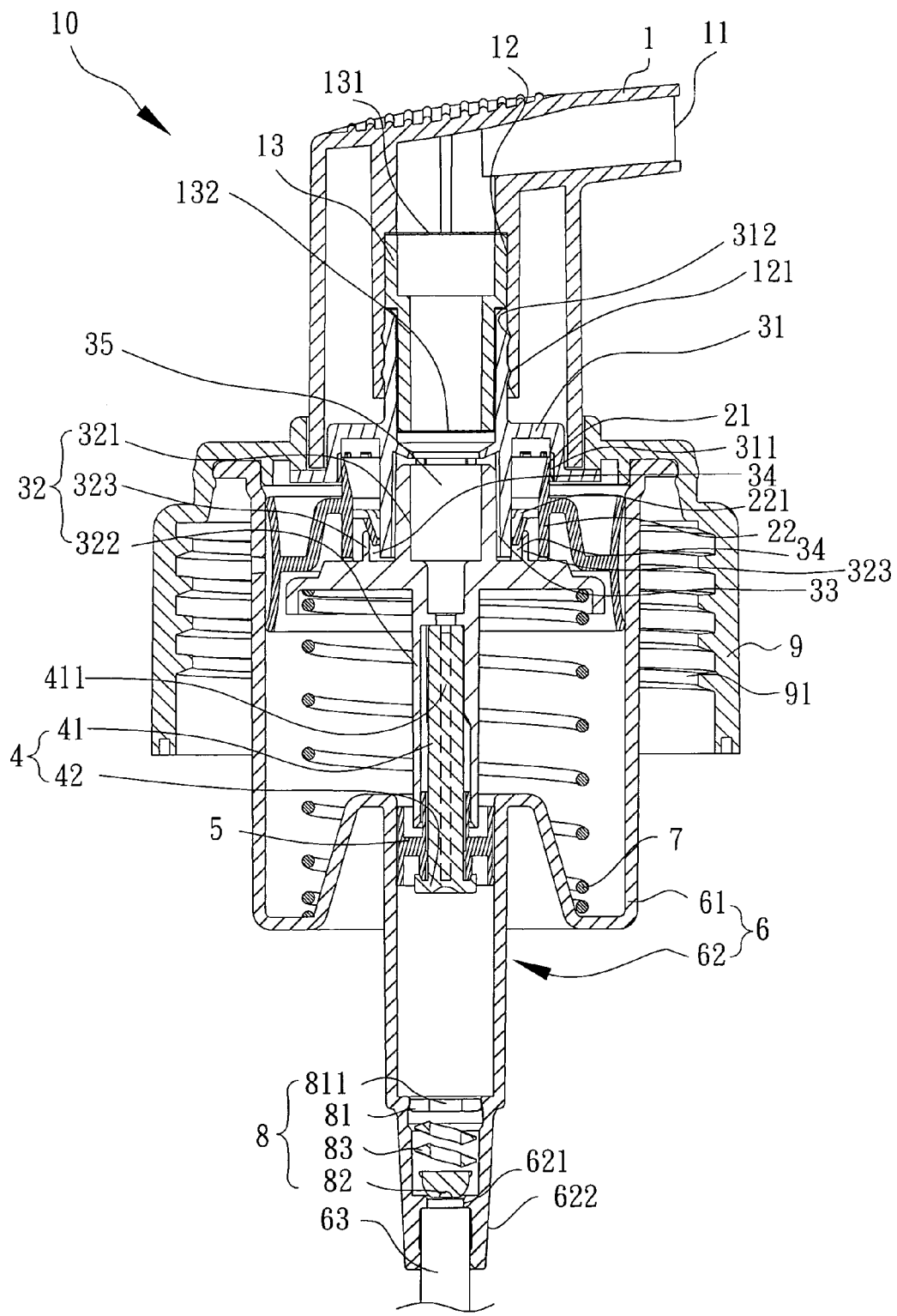
FIG. 2 is a cross sectional view of the foam spray head assembly of the present invention.

Referring to FIGS. 1 and 2, the foam spray head assembly 10 of the present invention comprises a head 1 having a nozzle 11 connected thereto and a space 12 is defined in the head 1. A filter tube 13 is located in the space 12. Two ends of the filter tube 13 are respectively mounted with a first filter 131 and a second filter 132. The first filter 131 has fine holes and the second filter 132 has large holes.

A first piston unit 2 is a hollow part and has a top opening 21 and a bottom opening 22 in two ends thereof. A sealing member 221 located in the bottom opening 22 and has a tapered central tube which resiliently mounts to the first valve 31 to seal the top chamber 61 of the cylinder 6. A valve unit 3 has a first valve 31 and a second valve 32, wherein the first valve 31 has a first end connected to the first piston unit 2 and a second end of the first valve 31 is connected to the filter tube 13 and the head 1. The second valve 32 has a first end connected to the first valve 31 and is mounted to the first piston unit 2. The second valve 32 has a mount tube 321 and a hollow extension tube 322 formed on two opposite ends thereof. The mount tube 321 is connected to the first valve 31 and an outgoing path 33 is defined between the mount tube 321 and the first valve 31. The mount tube 321 of the second valve 32 has a mixing space 35 defined therein. The second valve 32 has a flange 323 which is separated from the sealing member 221 to form an intake path 34 when the first valve 31 moves toward the second valve 32.

A link 4 has a tubular portion 41 which extends through the second valve 32, and multiple grooves 411 are defined axially in an outer surface of the tubular portion 41. A stop flange 42 extends radially from an end of the tubular portion 41. A second piston unit 5 is slidably mounted to the link 4 and movable along the link 4 to seal the grooves 411 or to allow the grooves 411 to be exposed;

A cylinder 6 whose outer diameter is gradually reduced and has a top chamber 61 and a bottom chamber 62. An inner diameter of the top chamber 61 is larger than that of the bottom chamber 62. The bottom chamber 62 accommodates the second piston unit 5 and the link 4. A through hole 621 is defined through the bottom chamber 62. The bottom chamber 62 of the cylinder 6 has a connection port 622 which includes a suction tube 63 connected thereto which extends into the bottle 20. A resilient member 7 is located in the top chamber 61 of the cylinder 6 and contacts between the second valve 32 and an inner end of the top chamber 61 of the cylinder 6.

A resilient valve 8 is a spiral valve and located in the bottom chamber 62 of the cylinder 6, the resilient valve 8 movable to seal or open the through hole 621. The resilient valve 8 includes a first end 81 and a second end 82, the first end 81 has a passage 811 and the second end 82 seals the through hole 621. A hollow resilient portion 83 is connected between the first and second ends 81, 82 so that the through hole 621 can be opened and closed when the resilient valve 8 is moved reciprocally. After all of the parts such as the head 1, the first piston unit 2, the valve unit 3, the link 4, the second piston unit 5, the cylinder 6, the resilient member 7 and the resilient valve 8 are installed and positioned, a positioning member 9 is connected to the bottle 20 and has a threaded portion 91 which is connected with the head 1 to connect the spray head assembly to the bottle 20.

The first valve 31 includes multiple inlets 311 defined in an inner periphery thereof and an outside of the top opening 21 of the first piston unit 2 seals the inlets 311 when the first valve 31 moves toward the second valve 32. The space 12 in the head 1 includes a groove portion 121 defined in an inner periphery thereof and the first valve 31 includes a protrusion portion 312 on an outside thereof. The protrusion portion 312 is engaged with the groove portion 121 to connect the first valve 31 to the head 1.

Figure 3:
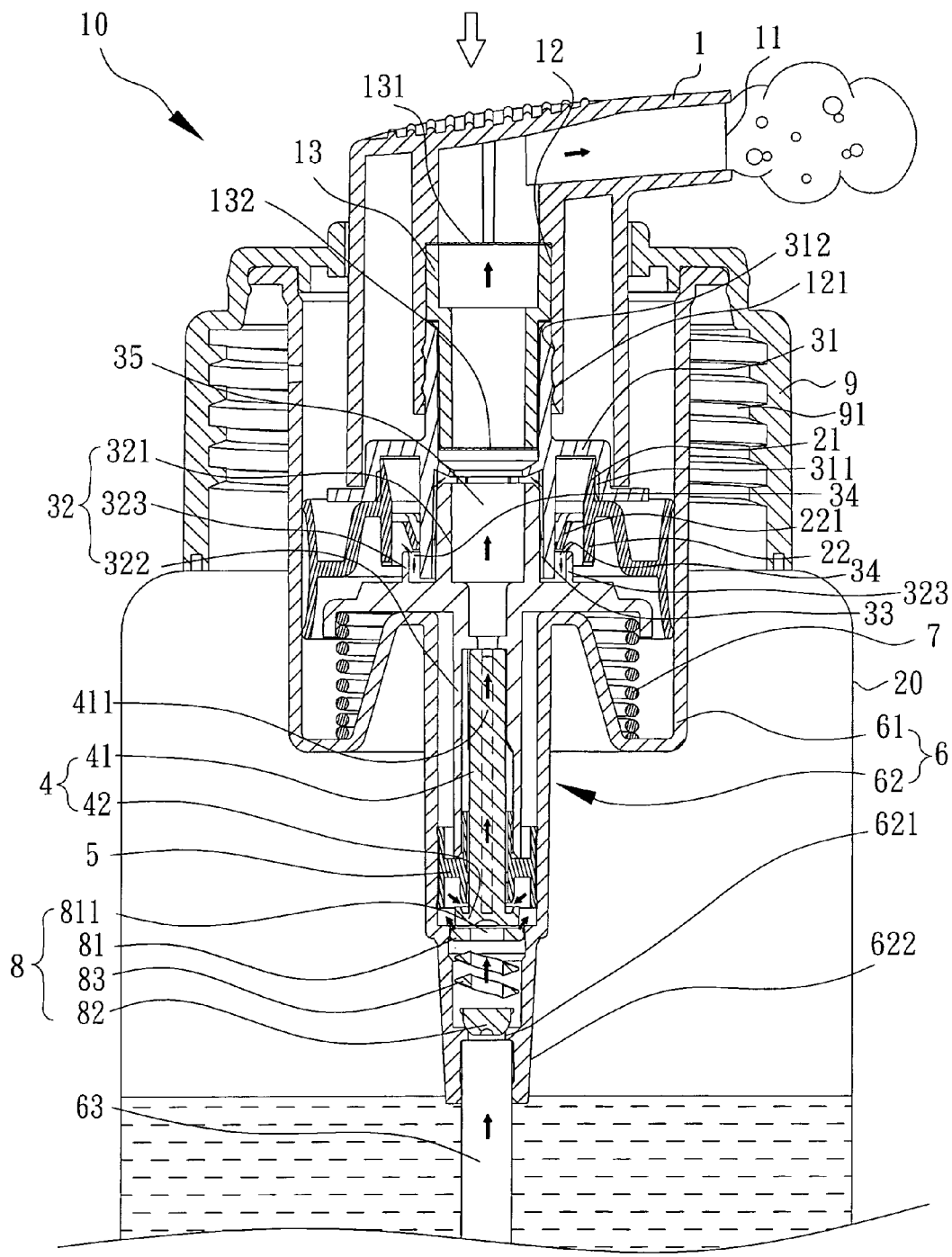
FIG. 3 is a cross sectional view to show one of the operated status of the foam spray head assembly of the present invention.

As shown in FIG. 3, when the head 1 is pressed downward, the first and second valves 31, 32 are lowered in sequence so that the link 4 is lowered to reduce the volume of the bottom chamber 62. Due to the hydraulic pressure, the second end 82 of the resilient valve 8 is lowered to seal the through hole 621 of the cylinder 6 to seal the bottom chamber 62. Therefore, the stop flange 42 of the link 4 is separated from the second piston unit 5, and the grooves 411 of the link 4 are exposed. The liquid in the bottom chamber 62 enters into the mixing space 35 via the second valve 32 by the high pressure. In the meanwhile, the flange 323 of the second valve 32 is gradually separated from the sealing member 221 to form an intake path 34. The inlet 311 of the first valve 31 is gradually in contact with the top opening 21 of the first piston unit 2 to seal the inlet 311. The first piston unit 2 gradually reduces the volume of the top chamber 61 and the air in the top chamber 61 flows into the outgoing path 33 via the intake path 34, and then enters into the mixing space 35 of the second valve 32. The air and the liquid are mixed in the mixing space 35 and then the mixture passes through the filter tube 13 to generate foam which is ejected from the nozzle 11. During the pressing action to the head 1, the valve unit 3 directly receives the pressure from the head 1 so as to quickly respond.

Figure 4:
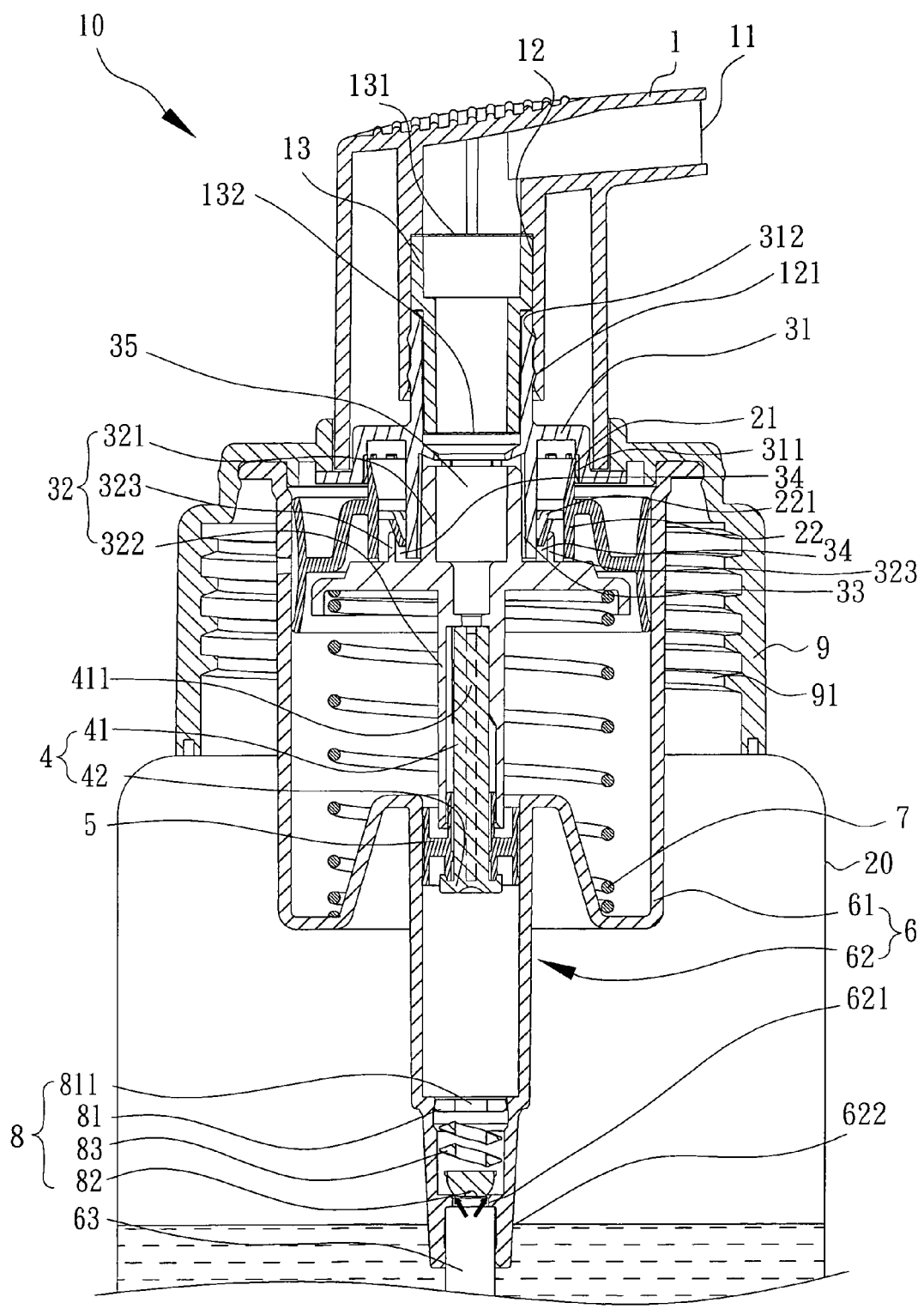
FIG. 4 is a cross sectional view to show another one of the operated status of the foam spray head assembly of the present invention.
Figure 5:
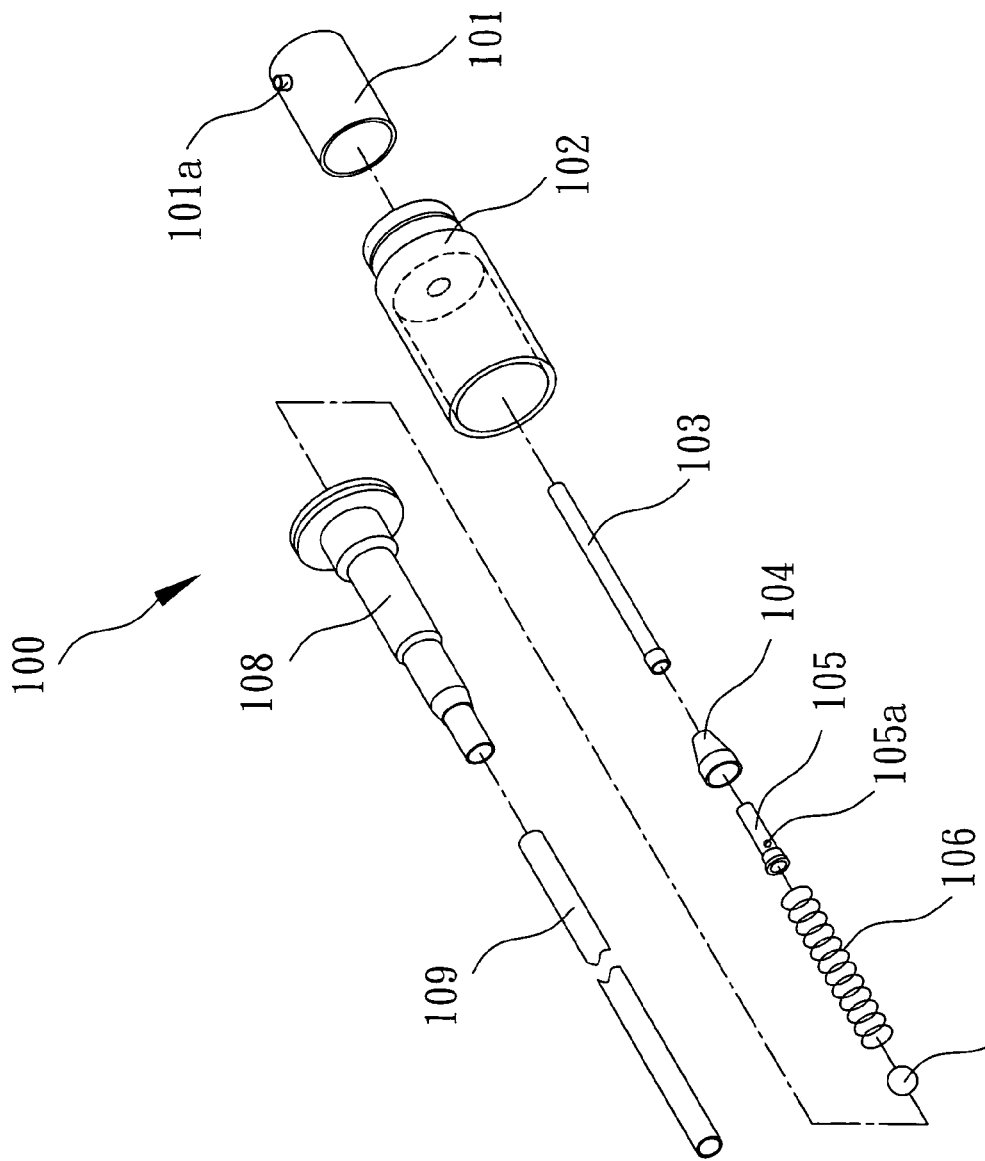
FIG. 5 is an exploded view to show a conventional spray head assembly.

FIG. 4 shows that when releasing the head 1, by the force of the resilient member 7, the first and second valves 3,1 32 and the link 4 are pushed upward, and the inlet 311 of the first valve 31 is separated from the top opening 21 of the first piston unit 2 such that the inlet 311 gradually opened. In the meanwhile, the flange 323 of the second valve 32 seals the top chamber 61. Along with the upward movement of the first piston unit 2y the second valve 32, the volume of the top chamber 61 increases and the air outside is sucked into the top chamber 61 via the inlet 311. The upward movement of the second valve 32 pushes the link 4 upward and the stop flange 42 of the link 4 seals the second piston unit 5, such that the pressure in the bottom chamber 62 is lower than the outside pressure. The liquid can pushes the second end 82 and is sucked into the bottom chamber 62 via the passage 811 of the resilient valve 8, and ready for the next pressing action.

The sealing member 221 seals the first valve 31 so that the top chamber 61 of the cylinder 6 is closed, and this improves the shortcoming of leakage of the conventional foam spray head assembly.

While we have shown and described the embodiment in accordance with the present invention, it should be clear to those skilled in the art that further embodiments may be made without departing from the scope of the present invention.

What is claimed is:

1. A spray head assembly comprising:
a head having a nozzle connected thereto and a space defined in the head, a filter tube located in the space;
a first piston unit being a hollow part and having a top opening and a bottom opening in two ends thereof, a sealing member located in the bottom opening;
a valve unit having a first valve and a second valve, the first valve having a first end connected to the first piston unit and a second end of the first valve connected to the filter tube and the head, the second valve having a first end connected to the first valve and mounted to the first piston unit, the second valve having a flange which is separated from the sealing member to form an intake path when the first valve moves toward the second valve;
a link having a tubular portion which extends through the second valve, multiple grooves defined axially in an outer surface of the tubular portion, a stop flange extending radially from an end of the tubular portion;
a second piston unit slidably mounted to the link and movable along the link to seal the grooves or to allow the grooves to be exposed;
a cylinder having a top chamber and a bottom chamber, an inner diameter of the top chamber being larger than that of the bottom chamber, the bottom chamber accommodating the second piston unit and the link, a through hole defined through the bottom chamber;
a resilient member located in the top chamber of the cylinder and contacting between the second valve and an inner end of the top chamber of the cylinder, and
a resilient valve being a spiral valve and located in the bottom chamber of the cylinder, the resilient valve movable to seal or open the through hole.

2. The assembly as claimed in claim 1, wherein a positioning member is connected to the head and an opening of a bottle to install the foam spray head device to the bottle.

3. The assembly as claimed in claim 2, wherein the positioning member includes a threaded portion defined in an inner periphery thereof so as to be connected to the bottle.

4. The assembly as claimed in claim 1, wherein the second valve has a mount tube and a hollow extension tube formed on two opposite ends thereof, the mount tube is connected to the first valve and an outgoing path is defined between the mount tube and the first valve.

5. The assembly as claimed in claim 4, wherein the mount tube of the second valve has a mixing space defined therein.

6. The assembly as claimed in claim 1, wherein the bottom chamber of the cylinder has a connection port.

7. The assembly as claimed in claim 6, wherein the connection port includes a suction tube connected thereto which extends into the bottle.

8. The assembly as claimed in claim 1, wherein the resilient valve includes a first end and a second end, the first end has a passage and the second end seals the through hole, a hollow resilient portion is connected between the first and second ends.

9. The assembly as claimed in claim 1, wherein two ends of the filter tube are respectively mounted with a first filter and a second filter.

10. The assembly as claimed in claim 9, wherein the first filter has fine holes and the second filter has large holes.

11. The assembly as claimed in claim 1, wherein the first valve includes multiple inlets defined in an inner periphery thereof and an outside of the top opening of the first piston unit seals the inlets when the first valve moves toward the second valve.

12. The assembly as claimed in claim 1, wherein the space in the head includes a groove portion defined in an inner periphery thereof and the first valve includes a protrusion portion on an outside thereof, the protrusion portion is engaged with the groove portion to connect the first valve to the head.

13. The assembly as claimed in claim 1, wherein the sealing member has a tapered central tube which resiliently mounts to the first valve to seal the top chamber of the cylinder.

* * * * *